United States Patent Office 3,741,916
Patented June 26, 1973

3,741,916
METHOD FOR POLYMERIZATION OF EPOXIDES
Harumi Asai and Ryuichiro Yoda, Tokyo, Japan, assignors to The Japanese Geon Company, Ltd., Tokyo, Japan
No Drawing. Filed Dec. 20, 1965, Ser. No. 515,168
Claims priority, application Japan, Jan. 5, 1965, 40/270; June 15, 1965, 40/35,180; July 7, 1965, 40/40,308
Int. Cl. C08f 7/12
U.S. Cl. 260—2 EP     6 Claims

ABSTRACT OF THE DISCLOSURE

A method for polymerizing or copolymerizing an olefin oxide monomer having a 3-membered cyclic ether group in the presence of a catalyst system composed of an organoaluminum compound represented by the general formula $AlX_nR_{3-n}$ (wherein X stands for a halogen atom, R stands for an alkyl group having 1–6 carbon atoms and n stands for a number of 0–2), an organic acid salt of a transition element, which furthermore optionally contains water and/or a non-cyclic halogenated ether.

---

This invention relates to a novel method for the polymerization of epoxide. More particularly, the invention relates to a novel method characterized by polymerizing a monomer or monomers containing epoxy group in the presence of a catalyst system consisting of an organoaluminium compound and an organic acid salt of a transition element, which furthermore optionally contains water and/or a noncyclic halogenated ether. The product of the subject method, for instance, high polymer of propylene oxide, is a rubber-like substance or an elastic body having many excellent characteristics.

In the invention, as one component of the catalyst system, organoaluminium compound represented by the general formula $AlX_nR_{3-n}$ is used. In the said formula, X stands for a halogen atom, i.e. fluorine, chlorine, bromine or iodine, and R stands for an alkyl, alkenyl, cycloalkyl or aralkyl group, and n is 0–2. This type of organoaluminium compound includes, for example, trimethyl aluminium, triethyl aluminium, tri-isobutyl aluminium, tri-n-butyl aluminium, dimethyl aluminium fluoride, dimethyl aluminium chloride, dimethyl aluminium bromide, diethyl aluminium chloride, di-isopropyl, aluminium chloride, methyl aluminium dichloride, ethyl aluminium dichloride, isobutyl aluminium dichloride, diphenyl aluminium chloride, ethyl aluminium sesquichloride, alkyl aluminium halide mixtures obtained by direct reaction of aluminium metal with alkyl halide, and alkyl halide mixtures obtained by mixing alkyl aluminium with aluminium halide.

The transition elements to form the organic acid salt of a transition element referred to in the above are those included in the series of first and second transition elements described in E. Cartmell & G. W. A. Fowles, Valency and Molecular Structure (Butterworths Scientific Pub., London, 1956) on p. 47, for example, cobalt, nickel, chromium, cadmium and zinc. Whereas, as the organic acids to form salts with those transition elements, fatty acids such as acetic, propionic, butyric, actanoic 2-ethylhexanoic, stearic, hydroxystearic, palmitic, azelaic, and sebacic acids, etc.; cyclic fatty acids such as naphthenic and tetrahydrophthalic acids, etc.; aromatic carboxylic acids such as benzoic, phthalic, and naphthalene carboxylic acids, etc.; and heterocyclic acids, for example, furoic acid; are contemplated. Those organic acid salts are normally not hydrated, and are commercialized in the form comparatively insensitive to moisture and easy for use. Again those salts having substantially high solubility in organic solvents, they are capable of producing catalyst of high reproducibility according to the present invention.

As the non-cyclic halogenated ether which may be another component of the catalyst system, for example, 1,2-dichloroethylethyl ether, di(2,2′-dichloroethyl)ether, 2-chloropropylphenyl ether, 2-chloroethylphenyl ether, 2-chloroethyl 2′-hydroxyethyl ether and chloromethylmethyl ether, etc. are useful.

In the catalyst system of the invention, the presence of at least the two components, that is, an organoaluminium compound and an organic acid salt of a transition element is required, but the catalytic activity of the system can be remarkably increased by the copresence of water and/or a non-cyclic halogenated ether.

While the blending ratio of the organoaluminium compounds and the organic acid salt in the catalyst system of the invention may be varied over a wide range, the generally preferred range is from 1:2 to 8:1 as molar ratio, particularly from 1:1 to 5:1.

Water may be used in an amount of 0.01 to 3 times or above to the organoaluminium compound in terms of molar ratio, preferably from 0.5 to 1.5 times, inter alia, 1.0.

The non-cyclic halogenated ethers can be used, in terms of molar ratio, 0.01 to 10 times the organoaluminium compound, preferably within the range of 0.1 to 2.0 times.

The above catalyst components react with each other to form the catalyst system of the present invention which is novel and exhibits very high activity. The catalytic activity of the catalyst system somewhat differs depending on the particular order by which the aforesaid catalyst components are blended, but in all cases a catalyst system useful for the method of the invention is obtained regardless of the order of blending the components. Particularly preferred order of blending is, for instance, when water is employed as one of the components, water—an organic acid salt of a transition element—an organoaluminium compound. If a halogenated ether is employed as one of the components, the preferred order of blending is an organic acid salt of a transition element—an organoaluminium compound—halogenated ether.

The amount of the catalyst to be used in the polymerization can also be varied over a wide range. It can be suitably used in an amount within such a wide range as the organoaluminium compound in the catalyst system varies from 0.001 mol percent to 10 mol percent or above to the monomer.

As the monomers having an epoxy group which can be polymerized in accordance with the invention, the following may be named: alkylene oxides such as ethylene, propylene, 1-butene, 2-butene, isobutylene, 1-pentene and 1-hexene oxides, etc.; cyclohexene oxide; styrene oxide; glycidyl ethers of phenol and bis-phenol; epoxide monomers containing halogen such as epichlorohydrine, epibromohydrine, epifluorohydrine, trifluoromethylethylene oxide, perfluoropropylene oxide, and perfluoroethylene oxide, etc.; and epoxide monomers having olefinic unsaturated bond such as butadiene monoxide, allylglycidyl ether, glycidyl methacrylate, glycidyl crotonate, β-methylglycidyl crotonate, allyl-β-methylglycidyl ether, divinylbenzene monoxide, 2,5 - dimethyl - 5,6-epoxy-1-hexene, 2 - methyl - 5,6 - epoxy-1-hexene, allyl-glycidyl sulfone and chloroprene monoxide, etc.

In the present invention, it is not true that always only one of those monomers should be used, but two or more of the monomers can be concurrently employed. For example, by the concurrent use of an unsaturated epoxide monomer and a saturated epoxide monomer, a vulcanizable copolymer having an olefinic unsaturated bond is formed.

In performing the polymerization using the catalyst system of the invention, the use of solvent or diluent is not particularly required. Whereas, either of them may be optionally used so far as it has no detrimental effect on the catalyst system and the monomer or monomers to be polymerized. For example, inert hydrocarbons such as aliphatic, aromatic, cycloaliphatic and olefinic unsaturated hydrocarbons may be used.

The polymerization method of the invention is practicable under wide ranges of temperature and pressure conditions. Normally the polymerization temperature is selected from the range of $-100°$ C. to $200°$ C., while the polymerization pressure, from that of 1 to 200 atmospheres.

Both the preparation of the catalyst system and the polymerization may be performed batchwise or continuously. If desired, it is also possible to perform the polymerization continuously in the phase of reaction mixture having a predetermined composition under agitation.

The polymer prepared in accordance with the present invention is a rubber-like substance and is useful as a starting material for rubber products.

Hereinafter the invention will be explained with reference to working examples.

EXAMPLE 1

A well dried pressure glass polymerization vessel having a capacity of 50 ml. was filled with dry nitrogen, and then charged with 20 ml. of n-hexane dried for 24 hours with calcium hydride. To the same 0.003 mol (0.362 g.) of diethyl aluminium chloride and 0.003 mol (1.04 g.) of cobalt octoate were added, and the vessel was shaken for several hours at room temperature. Thereafter 0.30 mol (17.4 g.) of propylene oxide dried with calcium hydride was put in the vessel and polymerized with shaking for 71 hours at $20°$ C. Then the reaction was stopped by addition of acetone to the reaction mixture, and the volatile component was removed from the system under reduced pressure. The thus obtained polymer was dissolved in acetone containing 0.4% of 4,4'-thio-bis-(6-t-butyl-m-cresol), and was washed with 1 N hydrochloric acid to be removed of the polymerization catalyst. After the subsequent neutralization with ½ N caustic soda, then, the polymer was thoroughly washed with water and dried under vacuum until its weight became constant. Weighing the same, it was found that an elastomeric solid polymer was obtained at a yield of 5.5%. The intrinsic viscosity $[\eta]$ of the polymer measured as to a solution obtained by dissolving 0.2 g. of the same in 100 ml. of benzene at $30°$ C. was 2.54. Unless otherwise specified, intrinsic viscosities appearing hereinafter were all measured under the above-described condition.

EXAMPLES 2–5

Example 1 was repeated except that the composition of the polymerization catalyst was varied each time. The results are shown in Table 1. In all cases, solid polymers were obtained.

TABLE 1

| Example No. | Propylene oxide, mol | Diethyl aluminium chloride | Cobalt octoate | Yield (percent) | Intrinsic viscosity $[\eta]$ |
|---|---|---|---|---|---|
| 2 | 0.30 | 0.006 mol (0.724 g.) | 0.003 mol (1.04 g.) | 12.3 | 1.74 |
| 3 | 0.30 | 0.012 mol (1.448 g.) | do | 19.5 | 1.45 |
| 4 | 0.30 | 0.018 mol (1.810 g.) | do | 18.4 | 1.33 |
| 5 | 0.30 | 0.024 mol (2.896 g.) | do | 14.4 | 0.98 |

EXAMPLES 6–9

Experiments were performed in the manner described in Example 1 while the type and amount of the organic acid salt were varied each time and the polymerization time was made 142 hours. The results are shown in Table 2 below. In all cases solid polymers were obtained.

TABLE 2

| Example No. | Propylene oxide | Diethyl aluminium chloride | Organic acid salt | Yield (percent) | Intrinsic viscosity $[\eta]$ |
|---|---|---|---|---|---|
| 6 | 0.38 mol (21.8 g.) | 0.006 mol (0.724 g.) | Nickel naphthenate 0.006 mol (3.00 g.) | 12.3 | 2.05 |
| 7 | 0.15 mol (8.7 g.) | 0.003 mol (0.362 g.) | Chromium naphthenate 0.003 mol (1.70 g.) | 29.4 | 1.84 |
| 8 | 0.13 mol (7.3 g.) | 0.003 mol (0.362 g.) | Cadmium naphthenate 0.003 mol (1.00 g.) | 11.6 | 0.20 |
| 9 | 0.22 mol (12.5 g.) | 0.004 mol (0.555 g.) | Zinc octoate 0.004 mol (1.50 g.) | 22.8 | 0.35 |

EXAMPLES 10–11

Example 1 was repeated except that diethyl aluminium chloride was replaced by triethyl aluminium. Results are shown in Table 3. In both cases solid polymers were obtained.

TABLE 3

| Example No. | Triethyl aluminium, g. | Triethyl aluminium cobalt octoate (mol ratio) | Yield (percent) | Intrinsic viscosity $(\eta)$ |
|---|---|---|---|---|
| 10 | 0.114 | 1 | 11.3 | 2.18 |
| 11 | 0.057 | 0.5 | 5.0 | 0.39 |

EXAMPLES 12–15

Experiments were performed in the manner described in Example 1 while the amount of n-hexane was made 10 ml., and the type of the epoxy monomer was varied each time. Results are shown in Table 4. In all cases solid polymers were obtained.

TABLE 4

| Example No. | Epoxy monomer | Diethyl aluminium chloride | Cobalt octoate | Yield (percent) | Intrinsic viscosity $[\eta]$ |
|---|---|---|---|---|---|
| 12 | Allylglycidyl ether, 0.10 mol (9.5 g.) | 0.004 mol (0.482 g.) | 0.001 mol (0.345 g.) | 10.0 | 0.11 |
| 13 | Epichlorohydrine, 0.10 mol (11.0 g.) | do | do | 66.5 | 0.25 |
| 14 | Styrene oxide, 0.10 mol (10.0 g.) | do | do | 66.2 | 0.11 |
| 15 | 1,2-butylene oxide, 0.10 mol (8.0 g.) | do | do | 30.7 | 1.35 |

EXAMPLE 16

A well dried pressure glass polymerization vessel having a capacity of 50 ml. was filled with dry nitrogen, and then charged with n-hexane which was well dried with calcium hydride, followed by further addition thereto of 0.1 mol (5.81 g.) of propylene oxide also dried with calcium hydride. The amount of n-hexane was such that the monomer concentration therein should be 4 mol percent.

To the same, 0.002 mol (0.036 g.) of water, 0.001 mol (0.345 g.) of cobalt octoate and 0.002 mol (0.228 g.) of triethyl aluminium were added in the order stated, and the polymerization was performed for 24 hours at $20°$ C. Thereafter the reaction was stopped by addition of acetone to the reaction mixture, and the volatile component was removed from the system under reduced pressure. The thus obtained polymer was dissolved in acetone containing 0.4% of 4,4'-thio-bis-(6-t-butyl-m-cresol), and washed with 1 N hydrochloric acid to be removed of the polymerization catalyst. After neutralization with ½ N caustic soda, the product was thoroughly washed with water and dried under vacuum until its weight became constant, to produce an elastomeric solid polymer at a yield of 41.2%. The intrinsic viscosity of the polymer was 5.34.

In a control wherein the use of water was omitted, a solid polymer having an intrinsic viscosity of 3.25 was obtained at a yield of 12.6%. From this result it can be understood that the addition of water brings about a conspicuous advantage.

EXAMPLE 17

Example 16 was repeated except that the components were blended in the order of n-hexane, propylene oxide, water, triethyl aluminium and cobalt octoate. A solid polymer having an intrinsic viscosity of 4.27 was obtained at a yield of 40.3%.

EXAMPLE 18

Example 16 was repeated except that the components were blended in the order of n-hexane, propylene oxide, cobalt octoate, triethyl aluminium and water. A solid polymer having an intrinsic viscosity of 3.98 was obtained at a yield of 21.2%.

EXAMPLE 19

Example 16 was repeated except that the components were blended in the order of n-hexane, cobalt octoate, triethyl aluminium, water and propylene oxide. A solid polymer having an intrinsic viscosity of 1.70 was obtained at a yield of 9.8%.

EXAMPLE 20

Example 16 was repeated except that 0.002 mol (0.242 g.) of diethyl aluminium chloride was used in place of triethyl aluminium, and the amount of water was 0.001 mol (0.018 g.). A solid polymer having an intrinsic viscosity of 0.26 was obtained at a yield of 3.4%.

EXAMPLE 21

Example 20 was repeated except that 0.002 and (0.254 g.) of ethyl aluminium dichloride was used in place of diethyl aluminium chloride. A solid polymer having an intrinsic viscosity of 0.61 was obtained at a yield at 5.2%.

EXAMPLES 22–28

Experiments were performed in the manner described in Example 16 while varied-organic acid salt of transition element was used in place of cobalt octenoate each time. As shown in Table 5, solid polymers were obtained in all cases.

TABLE 5

| Example No. | Organic acid salt of transition element | Mol used (g. value) | Yield (percent) | Intrinsic viscosity [η] |
|---|---|---|---|---|
| 22 | Zinc octoate | 0.002 (0.702) | 35.0 | 1.74 |
| 23 | Zirconium octoate | 0.001 (0.377) | 39.8 | 2.14 |
| 24 | Cadmium octoate | 0.001 (0.398) | 4.9 | 1.17 |
| 25 | Chromium naphthenate | 0.002 (1.130) | 48.1 | 0.86 |
| 26 | Nickel naphthenate | 0.002 (0.802) | 17.7 | 1.08 |
| 27 | Iron napthenate | 0.001 (0.398) | 31.5 | 1.44 |
| 28 | Copper napthenate | 0.001 (0.406) | 12.9 | 1.81 |

EXAMPLES 29–34

Experiments were performed in the manner described in Example 16 while the amount of water used was varied each time as shown in Table 6. In all cases solid polymers were obtained.

TABLE 6

| Example No. | Water/triethyl aluminium (mol ratio) | Yield (percent) | Intrinsic viscosity [η] |
|---|---|---|---|
| 29 | 0.1 | 11.0 | 2.25 |
| 30 | 0.5 | 25.3 | 3.43 |
| 31 | 1 | 41.2 | 5.32 |
| 32 | 1.5 | 19.3 | 2.51 |
| 33 | 2 | 4.0 | 0.26 |
| 34 | 3 | 4.6 | 0.25 |

EXAMPLES 35–38

When varied solvents were used in place of n-hexane of Example 16, in all cases solid polymers were obtained as shown in Table 7. The amount of the solvent in each case was, similarly to the case of n-hexane, such as to adjust the monomer concentration to 4 mol percent.

TABLE 7

| Example No. | Solvent | Yield (percent) | Intrinsic viscosity [η] |
|---|---|---|---|
| 35 | Benzene | 20.3 | 0.30 |
| 36 | Diethyl ether | 41.2 | 0.23 |
| 37 | Nitromethane | 4.3 | |
| 38 | n-Hexane-diethyl ether (1:1 volume ratio). | 16.3 | 0.20 |

EXAMPLES 39–40

When the polymerization temperature of Example 16 was varied, also solid polymers were obtained in all cases as shown in Table 8. In Example 40, the polymerization time was 5 hours.

TABLE 8

| Example No. | Polymerization temperature (° C.) | Yield (percent) | Intrinsic viscosity [η] |
|---|---|---|---|
| 39 | 5 | 4.8 | 0.61 |
| 40 | 60 | 63.0 | 5.13 |

EXAMPLE 41

Example 16 was repeated except that propylene oxide was replaced by 8.1 g. of styrene oxide, and the polymerization was performed for 24 hours at 60° C. A highly viscous polymer was obtained at a yield of 32.2%.

EXAMPLE 42

Example 41 was repeated except that 6.4 g. of 1,2-butylene oxide was used to produce a solid polymer having an intrinsic viscosity of 1.00 at a yield of 74.5%.

EXAMPLE 43

Example 41 was repeated except that phenylglycidyl ether was used to produce a solid polymer which is insoluble in n-hexane, benzene, dimethylformamide, methanol, tetrahydrofurane and acetone; and is partially soluble in chloroform, at a yield of 85.0%. The polymer obtained, had a melting point of 207° C.

EXAMPLE 44

Example 41 was repeated except that 8.1 g. of propylene oxide and 0.9 g. of allylglycidyl ether were used, to produce a solid polymer having an intrinsic viscosity of 0.16 at a yield of 8.7%.

EXAMPLE 45

A well dried pressure glass polymerization vessel having a capacity of 50 ml. was filled with dry nitrogen, and charged with n-hexane which was fully dried with calcium hydride. To the same, further 0.1 mol (5.81 g.) of propylene oxide also dried with calcium hydride was added. The said n-hexane was used in such an amount that the monomer concentration therein became 4 mol percent. To the vessel then 0.002 mol (0.286 g.) of 1,2-dichloroethylethyl ether, 0.001 mol (0.345 g. of cobalt octoate and 0.002 mol (0.228 g.) of triethyl aluminium were added in the order stated, and the polymerization was performed for 24 hours at 20° C. by letting stand the vessel. Thereafter the reaction was stopped by adding acetone to the reaction mixture, and the volatile component was removed from the system under reduced pressure. The thus obtained polymer was dissolved in acetone containing 0.4% of 4,4'-thio-bis-(6-t-butyl-m-cresol), and was washed with 1 N hydrochloric acid to be removed of the polymerization catalyst. After neutralization with ½ N aqueous solution of caustic soda, the product was thoroughly washed with water and dried under vacuum until its weight became constant, to produce an elastic polymer at a yield of 10.8%. The intrinsic viscosity of the polymer was 5.11.

In a control wherein the use of 1,2-dichloroethylethyl ether was omitted, a solid polymer having an intrinsic viscosity of only 3.25 was obtained at a yield of 12.6%. Therefore it can be understood that the advantage of addition of 1,2-dichloroethylethyl ether is conspicuous.

EXAMPLE 46

When the order of addition of the catalyst components of Example 45 was varied to cobalt octoate, triethyl aluminium and 1,2-dichloroethylethyl ether, a solid polymer having an intrinsic viscosity of 5.37 was obtained at a yield of 21.6%.

EXAMPLES 47–52

Experiments were performed in the manner described as to Example 45, except that different type of halogenated ether was used each time in place of 1,2-dichloroethylethyl ether. In all cases solid polymers were obtained as shown in Table 9.

TABLE 9

| Example No. | Halogenated ether (amount used g.) | Yield (percent) | Intrinsic viscosity $[\eta]$ |
|---|---|---|---|
| 47 | Chloromethylmethyl ether (0.161) | 15.8 | 3.71 |
| 48 | 2-chloroethylvinyl ether (0.213) | 30.2 | 1.83 |
| 49 | di(2,2'-dichloromethyl) ether (0.286) | 22.2 | 4.32 |
| 50 | 2-chloropropylphenyl ether (0.341) | 22.5 | 5.28 |
| 51 | β-chlorophenetol (0.313) | 20.7 | 3.42 |
| 52 | β-chloroethyl β'-hydroxyethyl ether (0.217) | 14.7 | 3.90 |

EXAMPLES 53–56

Experiments were performed in the manner described as to Example 45 except that di(2,2'-dichloroethyl) ether was used in place of 1,2-dichloroethylethyl ether in varied amounts. Results are shown in Table 10. In all cases solid polymers were obtained.

TABLE 10

| Example No. | Di(2,2'-dichloroethyl) ether | Di(2,2'-dichloroethyl) ether/triethyl aluminium (mol ratio) | Yield (percent) | Intrinsic viscosity $[\eta]$ |
|---|---|---|---|---|
| 53 | 0.029 | 0.1 | 21.7 | 5.45 |
| 54 | 0.143 | 0.5 | 22.2 | 4.89 |
| 55 | 0.429 | 1.5 | 24.0 | 3.98 |
| 56 | 0.572 | 2.0 | 24.4 | 2.73 |

EXAMPLE 57

Example 54 was repeated with addition of 0.018 g. of water to produce a solid polymer having an intrinsic viscosity of 6.63 at a yield of 38.6%.

EXAMPLES 58–59

When the polymerization temperature of Example 45 was varied, in all cases solid polymers were obtained as shown in Table 11.

TABLE 11

| Example No. | Polymerization temperature (° C.) | Yield (percent) | Intrinsic viscosity $[\eta]$ |
|---|---|---|---|
| 58 | 5 | 12.0 | 1.66 |
| 59 | 60 | 40.6 | 5.57 |

EXAMPLES 60–61

When various solvents were employed in place of n-hexane in Example 45, in all cases solid polymers were obtained as shown in Table 12.

TABLE 12

| Example No. | Solvent | Yield (percent) | Intrinsic viscosity $[\eta]$ |
|---|---|---|---|
| 60 | Benzene | 15.2 | 3.73 |
| 61 | Diethyl ether | 17.3 | 3.03 |

EXAMPLE 62

When triethyl aluminium of Example 45 was replaced by diethyl aluminium chloride, a solid polymer having an intrinsic viscosity of 3.26 was obtained at a yield of 14.7%.

EXAMPLE 63

When triethyl aluminum of Example 45 was replaced by ethyl aluminium dichloride, a solid polymer having an intrinsic viscosity of 3.18 was obtained at a yield of 9.0%.

EXAMPLE 64

When cobalt octoate of Example 45 was replaced by zinc octoate, a solid polymer having an intrinsic viscosity of 3.61 was obtained at a yield of 9.3%.

EXAMPLE 65

When 0.005 mol of allylglycidyl ether was further added as the epoxide monomer besides propylene oxide of Example 45, a solid polymer having an intrinsic viscosity of 3.07 was obtained at a yield of 14.7%. The presence of carbon-to-carbon double bond in the resultant copolymer was confirmed by the infrared absorption spectrum thereof.

The solid polymer (rubber) obtained in this example was blended in a composition as specified below, and vulcanized for 30 minutes at 300° F. The product had a tensile strength of 140 kg./cm.$^2$, an elongation of 870% and a repulsive elasticity of 37.5%.

Composition: Parts by weight
 Rubber _____ 100.0
 Phenylnaphthyl amine _____ 2.0
 Stearic acid _____ 2.0
 Zinc oxide _____ 10.0
 Carbon black (SPF) _____ 35.0
 Sulfur _____ 5.0
 Tetramethylthiuram disulfide _____ 2.0
 2-mercaptobenzothiazole _____ 2.0

EXAMPLE 66

When glycidyl methacrylate was used in place of the allylglycidyl ether of Example 65, a solid polymer having an intrinsic viscosity of 5.78 was obtained at a yield of 38.5%. The presence of carbon-to-carbon double bond in the same polymer was confirmed by the infrared absorption spectrum thereof.

EXAMPLE 67

When styrene oxide was used in place of the propylene oxide of Example 45, a highly viscous, oily polymer was obtained at a yield of 28.4%.

EXAMPLE 68

When 1,2-butylene oxide was used in place of the propylene oxide of Example 45, a solid polymer having an intrinsic viscosity of 0.84 was obtained at a yield of 50.7%.

We claim:
1. A process of producing a polymer of an epoxide compound which comprises polymerizing at least one 1,2-epoxide selected from the group consisting of alkylene oxides containing 2-4 carbon atoms in their molecules, epihalohydrins, allyl glycidyl ether, butadiene monooxide, and styrene oxide by contacting said 1,2-epoxide with catalytic amount of a catalyst comprising:
   (a) an organoaluminum compound selected from the group consisting of trialkylaluminums and dialkylaluminum monohalides, wherein the alkyl group contains from 1-6 carbon atoms; and
   (b) a metal salt of carboxylic acid wherein the metal is selected from the group consisting of Cr, Co, and Ni and the carboxylic acid is selected from the group consisting of saturated aliphatic monocarboxylic acids containing from 2-18 carbon atoms and naphthenic acid.

2. A process of producing a polymer of an epoxide compound which comprises polymerizing at least one 1,2-epoxide selected from the group consisting of alkylene oxides containing 2-4 carbon atoms in their molecules, epihalohydrins, allyl glycidyl ether, butadiene monooxide, and styrene monoxide by contacting said 1,2-epoxide with catalytic amounts of a catalyst comprising:
   (a) an organoaluminum compound selected from the group consisting of trialkylaluminums, dialkylaluminum monohalides and monoalkylaluminum dihalides, wherein the alkyl group contains from 1 to 6 carbon atoms; and
   (b) a metal salt of carboxylic acid wherein the metal is selected from the group consisting of chromium, cobalt, nickel, cadmium, zinc and iron; and the carboxylic acid is selected from the group consisting of saturated aliphatic mono- and dicarboxylic acids, and aromatic mono- and dicarboxylic acids.

3. A process according to claim 2 wherein the mol ratio of the organoaluminum compound to the carboxylic acid metal salt in the catalyst system is 0.5 to 8:1.

4. A process according to claim 2 wherein the mol ratio of the organoaluminum compound to the carboxylic acid metal salt in the catalyst system is 0.5 to 8:1 and the polymerization is performed at a temperature of —100 to 200° C. and a pressure of from 1 to 200 atmospheres.

5. A process according to claim 2 wherein the mol ratio of the organoaluminum compound to the carboxylic acid metal salt in the catalyst system is 0.5 to 8:1 and the polymerization is performed at a temperature of —100 to 200° C. and a pressure of from 1 to 200 atmospheres in a substantial mixture consisting essentially of water and a non-cyclic mono- or di-chlorinated ether, the mol ratio of said water to said organoaluminum compound being within the range of 0.01 to 3:1.

6. A process according to claim 2 wherein the mol ratio of the organoaluminum compound to the carboxylic acid metal salt in the catalyst system is 0.5 to 8:1 and the polymerization is performed at a temperature of —100 to 200° C. and a pressure of from 1 to 200 atmospheres, the organoaluminum compound being presented in such amount as being 0.001 to 10 mole percent to the monomer.

References Cited

UNITED STATES PATENTS

| | | | |
|---|---|---|---|
| 3,135,705 | 6/1964 | Vandenberg | 260—2 EP |
| 2,911,377 | 11/1959 | Gurgiolo et al. | 260—2 EPA |
| 3,259,590 | 7/1966 | Weissermel et al. | 260—20 X |

OTHER REFERENCES

J. of Polymer Science, vol. 47, issue 149 (1960) (pp. 486–488 relied on).

HARRY WONG, Jr., Primary Examiner

U.S. Cl. X.R.

260—2 A, 32.8 EP, 47 UA, 79.7, 88.3 A